United States Patent
Jeong

(10) Patent No.: US 9,978,055 B2
(45) Date of Patent: May 22, 2018

(54) WATCH WITH A FUNCTION OF A MOBILE PAYMENT INSTRUMENT AND PAYMENT METHOD OF THE SAME

(71) Applicant: JINI CO.,LTD, Jeonju-si (KR)

(72) Inventor: Hye Jin Jeong, Iksan-si (KR)

(73) Assignee: JINI CO., LTD, Jeongju-si (KR)

( * ) Notice: Subject to any disclaimer, the term of this patent is extended or adjusted under 35 U.S.C. 154(b) by 169 days.

(21) Appl. No.: 14/607,239

(22) Filed: Jan. 28, 2015

(65) Prior Publication Data
US 2016/0148189 A1    May 26, 2016

(30) Foreign Application Priority Data
Nov. 24, 2014    (KR) .................. 10-2014-0164751

(51) Int. Cl.
G06Q 20/34    (2012.01)
G07F 7/08    (2006.01)
G07F 7/10    (2006.01)

(52) U.S. Cl.
CPC .......... *G06Q 20/34* (2013.01); *G07F 7/0873* (2013.01); *G07F 7/10* (2013.01)

(58) Field of Classification Search
USPC ........................................... 235/380
See application file for complete search history.

(56) References Cited

U.S. PATENT DOCUMENTS

| 8,095,974 | B2* | 1/2012 | Aaron | G06F 21/35 235/380 |
| 2004/0225613 | A1* | 11/2004 | Narayanaswami | G06Q 10/087 705/64 |
| 2005/0177716 | A1* | 8/2005 | Ginter | G06F 21/10 713/157 |

(Continued)

FOREIGN PATENT DOCUMENTS

| JP | 2001-256566 A | 9/2001 |
| KR | 10-2012-0085054 A | 7/2012 |

(Continued)

OTHER PUBLICATIONS

Korean Office Action dated Apr. 25, 2017, in connection with corresponding KR Application No. 10-2015-0164318 (4 pgs., including partial English translation).

(Continued)

*Primary Examiner* — Michael G Lee
*Assistant Examiner* — David Tardif
(74) *Attorney, Agent, or Firm* — Maier & Maier, PLLC

(57) ABSTRACT

Disclosed are a watch with a function of a mobile payment instrument and a method of the same. The watch with a function of a mobile payment instrument includes a Real Time Clock RTC unit providing real time information, a communication unit 14 receiving payment request information or a payment process result, or transmitting card information with a PIN, a display unit displaying the real time information, the payment request information or the payment process result, a reader reading a card, an input unit inputting a PIN, and a controller controlling the communi- (Continued)

cation of the communication unit, the display of the display unit, a collecting of the card information read by the reader or a collecting of the PIN inputted by the input unit.

6 Claims, 3 Drawing Sheets

(56) References Cited

U.S. PATENT DOCUMENTS

| | | | | |
|---|---|---|---|---|
| 2005/0275505 | A1* | 12/2005 | Himmelstein | G10L 17/22 340/5.8 |
| 2008/0099553 | A1* | 5/2008 | Stevens | G04G 21/04 235/380 |
| 2009/0307132 | A1* | 12/2009 | Phillips | G06Q 20/105 705/41 |
| 2011/0140841 | A1* | 6/2011 | Bona | G06K 19/06187 340/5.83 |
| 2014/0239065 | A1 | 8/2014 | Zhou et al. | |

FOREIGN PATENT DOCUMENTS

| | | |
|---|---|---|
| KR | 10-1181397 B1 | 9/2012 |
| KR | 10-2012-0128372 A | 11/2012 |
| KR | 10-2015-0036946 A | 4/2015 |

OTHER PUBLICATIONS

Korean Office Action dated Nov. 4, 2015, in connection with corresponding KR Application No. 10-2014-0164751 (4 pgs., including partial English translation).

* cited by examiner

WATCH WITH A FUNCTION OF A MOBILE PAYMENT INSTRUMENT AND PAYMENT METHOD OF THE SAME

CROSS-REFERENCE TO RELATED APPLICATIONS

This application claims the benefit of the Korean Patent Application No. 10-2014-0164751 filed on Nov. 24, 2014, which is hereby incorporated by reference as if fully set forth herein.

BACKGROUND OF THE INVENTION (a) Field of the Invention

The present invention relates to a watch with a function of a mobile payment instrument, which is normally used as a wristwatch and is used as a card payment instrument for a payment, and a payment method of the same.

(b) Description of the Related Art

Generally, for a payment for a product or service, a personal identification number PIN (password) is inputted into smart equipment or a fixed PIN input equipment of a seller.

However, if a PIN is inputted into a terminal of a seller, there is a danger that the PIN is exposed to a seller or the like other than a person inputting the PIN. Moreover, a display unit of a card reader of a seller is only used for displaying a result of approval for a payment.

Moreover, in a wristwatch disclosed in Korean Utility Model Registration No 20-0386433, a title of which is "MOUNTING STRUCTURE OF ACTUATOR OF ELECTRONIC PAYMENT IN A WRISTWATCH", a driving unit for an electronic payment is equipped, but the wristwatch only performs a function of a transportation card, and thus, the wristwatch cannot read a card and cannot receive a PIN to directly communicate.

SUMMARY OF THE INVENTION

Accordingly, the present invention is directed to provide a watch and a payment method of the same that substantially obviate one or more problems due to limitations and disadvantages of the related art.

An aspect of the present invention is directed to provide a watch, which is normally used as a wristwatch and is used as a card payment instrument when a payment process is needed, and a payment method of the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a watch with a function of a mobile payment instrument including: a Real Time Clock RTC unit providing real time information; a communication unit receiving payment request information or a payment process result, or transmitting card information with a PIN; a display unit displaying the real time information, the payment request information or the payment process result; a reader reading a card such as a IC card or a magnetic card; an input unit inputting a PIN; and a controller controlling the communication of the communication unit, the display of the display unit, a collecting of the card information read by the reader or a collecting of the PIN inputted by the input unit.

Also, the controller may record a payment approval request time according to the RTC unit.

The communication unit may communicate by using a communication method such as Bluetooth, Wireless Fidelity Wi-Fi, 3G, 4G, Light Fedlity, or the like. Also, the communication unit may directly transmit card information, or the like, to a server managed by a payment gateway PG company, a Value Added Network VAN company, or a card company. Moreover, the communication unit may communicate with a seller terminal, and thus, transmit and receive information by using a wire-wireless communication network between the seller terminal and the PG company or the VAN company or the card company.

Here, a forgery detection unit, in which a kernel is embedded so that a forgery of a card such as the IC card or the magnetic card is detected, may be further included.

Furthermore, a data processor, which encrypts card information if the forgery detection unit determines the card is not a forgery or processes an application concerning a payment, may be further included.

Furthermore, a housing protecting the RTC unit, the communication unit, the reader and the controller, and a holder, in which a protrusion is formed so that the holder is coupled to the housing in a sliding manner and a watch strap is provided, are further included. Here, the display unit and the input unit are provided in a plane of the housing, a pin connector and a power button are provided in a front side of the housing, and a sliding groove is formed in each of both sides of the housing. Moreover, the input unit may be formed in a touch screen type, in which the input unit is provided as one body with the display unit, or may be a physical button.

In another aspect of the present invention, there is provided a payment method of a watch with a function of a mobile payment instrument including: displaying a time according to a RTC unit in a watch mode; determining, by a controller, whether a communication unit receives a payment request information or not; decoding, by a reader, a card if there is a payment request; receiving, by an input unit, card information including a PIN and transmitting, by a communication unit, the card information to a seller terminal, or a payment gateway PG company, or a value added network VAN company or a card company; receiving, by the communication unit, a payment process result if any one of the PG company, the VAN company and the card company approve the payment; and displaying the payment process result in a display unit.

In the process of the decoding, a forgery detection unit determines whether a card is reproduced or not.

Moreover, the card information is encrypted by a data processor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 is a perspective view of the watch with a function of a mobile payment instrument according to an embodiment of the present invention; and.

DETAILED DESCRIPTION OF THE EMBODIMENTS

Figure 1:
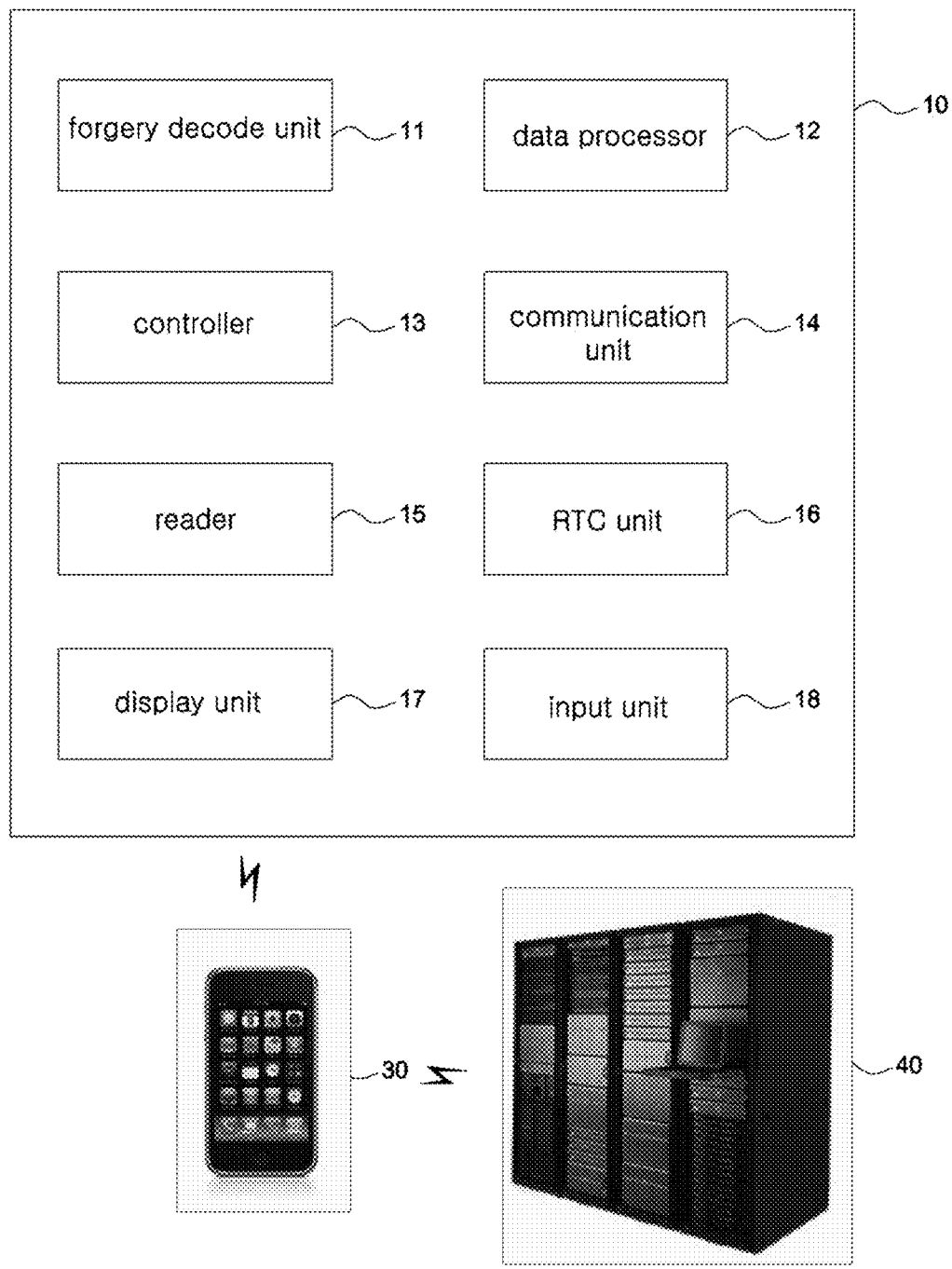
FIG. 1 is an entire conceptual view illustrating a communication between a watch with a function of a mobile payment instrument according to an embodiment of a present invention, a seller terminal 30 and a card approval company server.

Hereinafter, embodiments of the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known configuration or function is determined to unnecessarily obscure the important point of the present invention, the detailed description will be omitted.

FIG. 1 is an entire conceptual view illustrating a communication between a watch with a function of a mobile payment instrument according to an embodiment of a present invention, a seller terminal 30 and a card approval company server 40.

As shown in FIG. 1, a watch with a function of a mobile payment instrument 10 includes a Real Time Clock RTC unit 16 providing real time information, a communication unit 14 receiving payment request information or a payment process result, or transmitting card information with a PIN, a display unit 17 displaying the real time information, the payment request information or the payment process result, a reader 15 reading a card, an input unit 18 inputting a PIN, and a controller 13 controlling the communication of the communication unit 14, the display of the display unit 17, a collecting of the card information read by the reader 15 or a collecting of the PIN inputted by the input unit 18. Moreover, the communication unit 14 may directly transmit card information or the like, to a card approval company server 40 managed by a payment gateway PG company, a Value Added Network VAN company, a card company or the like. Also, the communication unit 14 may communicate with a seller terminal 30 and thus, transmit and receive information by using a wire-wireless communication network between the seller terminal 30 and the PG company or the VAN company or the card company.

Here, the reader 15 may further include a space into which a card is inserted, but the reader 15 may be an integrated reader 15 which communicates by using a local area network such as Radio Frequency RF, Near Field Communication NFC or the like.

Here, the watch 10 with a function of a mobile payment instrument of the present invention may further include a forgery detection unit 11, in which a kernel is embedded so that a forgery of a card may be determined.

Furthermore, the watch 10 with a function of a mobile payment instrument of the present invention may further include a data processor 12, which encrypts card information if the forgery detection unit determines the card is not a forgery or processes an application concerning a payment.

Figure 2:
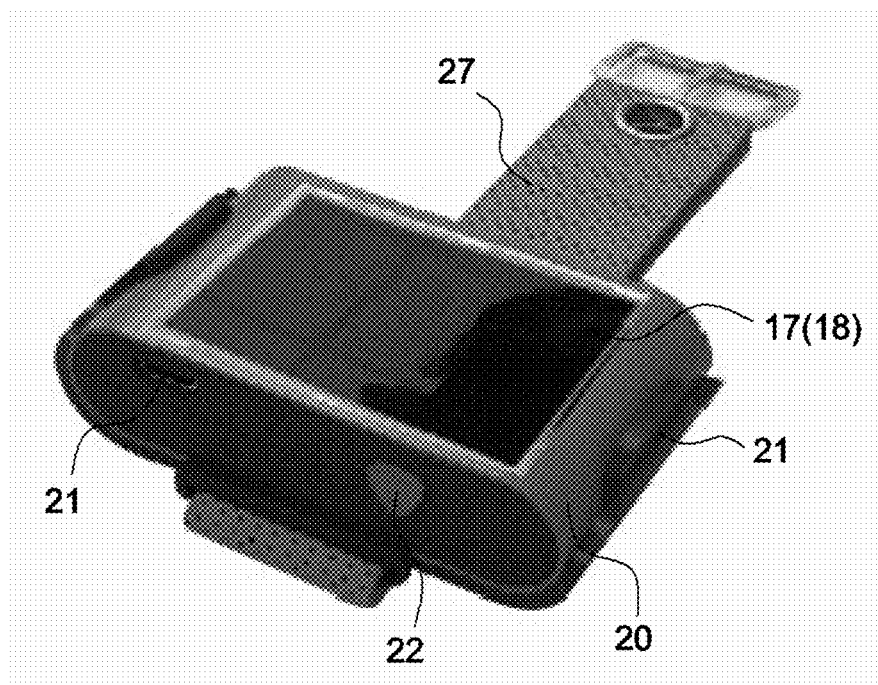

FIG. 2 is a perspective view of the watch 10 with a function of a mobile payment instrument according to an embodiment of the present invention.

As shown in FIG. 2, a housing 20 protecting the RTC unit 16, the communication unit 14, the reader 15 and the controller 13, and a holder 25, in which a protrusion (not shown) is formed so that the holder 25 is coupled to the housing 20 in a sliding manner and a watch strap 27 is provided, are further included. Here, the display unit 17 and the input unit 18 are provided in a plane of the housing 20, a pin connector 21 and a power button 22 are provided in a front side of the housing 20, and a sliding rail groove (not shown) is formed in each of both sides of the housing 20. Moreover, the input unit 18 may be formed in a touch screen type, in which the input unit is provided as one body with the display unit 17. Also the input unit 18 may be a physical button.

Moreover, various data including an application concerning a payment or the like may be downloaded through the pin connector 21.

Figure 3:
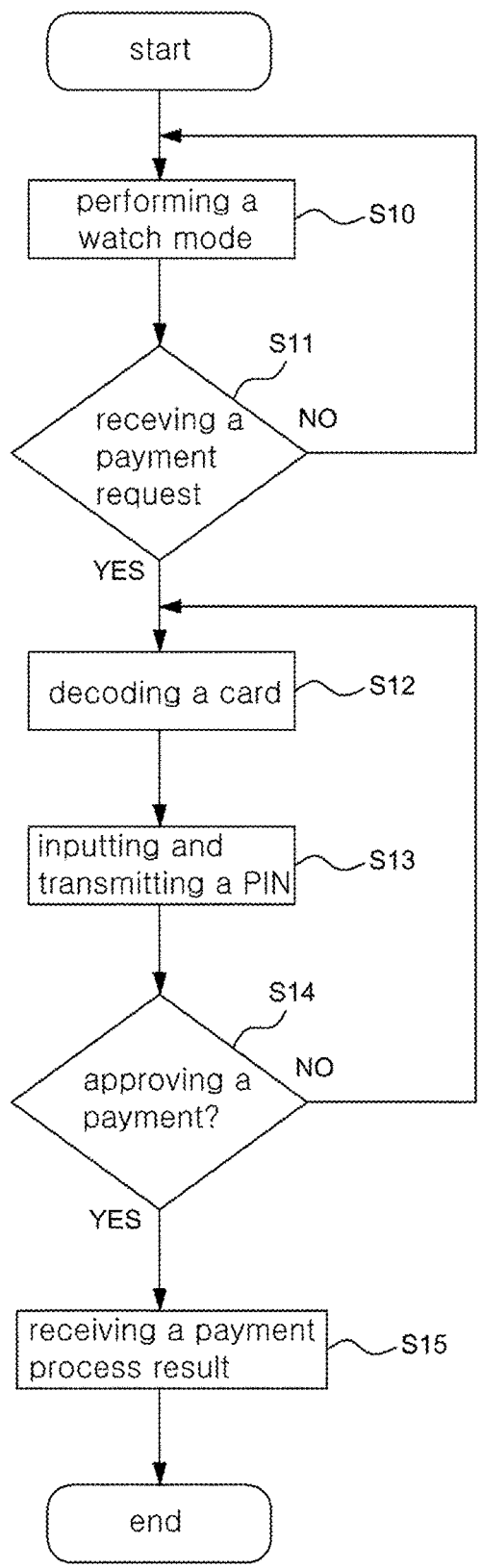
FIG. 3 is a flowchart of performing a payment method by using the watch 10 with a function of a mobile payment instrument according to an embodiment of the present invention.

FIG. 3 is a flowchart of performing a payment method by using the watch 10 with a function of a mobile payment instrument according to an embodiment of the present invention.

First of all, in a watch mode, a step S10, in which a time is displayed according to the RTC unit 16, is performed. The watch mode denotes a normal mode in which a payment is not performed.

Next, a step S11, in which the controller 13 determines whether the communication unit 14 receives a payment request information or not, is performed.

The payment request information may include information of a product, for which the payment is performed, a price of the product or the like.

Next, a step S12, in which the reader 15 reads a card if there is a payment request, is performed.

Next, a step S313, in which the input unit 18 receives card information including a PIN and the communication unit 14 transmits the card information to a seller terminal 30, or a payment gateway PG company, or a value added network VAN company or a card company, is performed.

Next, a step S15, in which the communication unit 14 receives a payment process result if any one of the PG company, the VAN company and the card company approve the payment, is performed.

Also, a step (not shown), in which the payment process result is displayed in the display unit, may be further performed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

A watch according to the present invention may be normally used as a wristwatch and may be used as a card payment instrument when a payment process is needed, and thus, a consumer may insert a card into the watch with a function of a payment instrument in person to use the card, and may safely input a password.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A watch with a function of a mobile payment instrument comprising:
   a Real Time Clock RTC unit providing real time information in a watch mode;
   a communication unit receiving payment request information or a payment process result, or transmitting card information with a PIN;
   a display unit displaying the real time information, the payment request information or the payment process result;
   a reader reading a card to transmit the card information of the card to at least one of a seller terminal, a payment gateway (PG) company, a value added network (VAN) company, and a card company;
   an input unit inputting a PIN;
   a controller controlling a communication of the communication unit, a display of the display unit, a collecting of the card information read by the reader or a collecting of the PIN inputted by the input unit; and
   a forgery detection unit in which a kernel is embedded so that a forgery of a card is detected.

2. The watch of claim 1, further comprising a data processor, which encrypts card information if the forgery detection unit determines the card is not a forgery or processes an application concerning a payment.

3. The watch of claim 1, further comprising
   a housing protecting the RTC unit, the communication unit, the reader and the controller; and
   a holder, in which a protrusion is formed so that the holder is coupled to the housing in a sliding manner and a watch strap is provided,
   wherein the display unit and the input unit are provided in a plane of the housing, a pin connector and a power button are provided in a front side of the housing, and a sliding rail groove is formed in each of both sides of the housing, and
   the input unit is formed in a touch screen type, in which the input unit is provided as one body with the display unit, or is a physical button.

4. The watch of claim 2, further comprising a housing protecting the RTC unit, the communication unit, the reader and the controller; and
   a holder, in which a protrusion is formed so that the holder is coupled to the housing in a sliding manner and a watch strap is provided,
   wherein the display unit and the input unit are provided in a plane of the housing, a pin connector and a power button are provided in a front side of the housing, and a sliding rail groove is formed in each of both sides of the housing, and
   the input unit is formed in a touch screen type, in which the input unit is provided as one body with the display unit, or is a physical button.

5. A payment method of a watch with a function of a mobile payment instrument, the method comprising:
   displaying a time according to a RTC unit in a watch mode;
   determining, by a controller, whether a communication unit receives a payment request information or not;
   reading, by a reader, a card if there is a payment request and taking card information of the card which is to transmitted to at least one of a seller terminal, a payment gateway (PG) company, a value added network (VAN) company, and a card company;
   receiving, by an input unit, the card information including a PIN and transmitting, by a communication unit, the card information to the seller terminal, or the payment gateway PG company, or the value added network VAN company or the card company;
   receiving, by the communication unit, a payment process result if any one of the PG company, the VAN company and the card company approve the payment; and
   displaying the payment process result in a display unit,
   wherein in the reading of the card, a forgery detection unit determines whether the card is reproduced or not.

6. The method of claim 5, wherein the card information is encrypted by a data processor.

* * * * *